United States Patent [19]
Glass

[11] Patent Number: 5,228,731
[45] Date of Patent: Jul. 20, 1993

[54] LOCKING PIN ASSEMBLY

[76] Inventor: Dennis U. Glass, 1531 SE. Burning Ct., Port St. Lucie, Fla. 34952

[21] Appl. No.: 915,278

[22] Filed: Jul. 20, 1992

[51] Int. Cl.$^5$ ............................................. E05C 19/18
[52] U.S. Cl. ...................................... 292/258; 411/60; 411/79; 292/DIG. 46
[58] Field of Search ................ 292/19, 258, 288, 293, 292/DIG. 46, DIG. 47, 252; 411/60, 61, 79, 80

[56] References Cited

U.S. PATENT DOCUMENTS

| | | | |
|---|---|---|---|
| 2,807,489 | 9/1957 | Adams | 292/DIG. 46 |
| 3,301,123 | 1/1967 | Worley | 411/80 |
| 3,709,088 | 1/1973 | Pityer | 411/60 X |
| 4,537,542 | 8/1985 | Pratt et al. | 411/60 X |
| 4,548,533 | 10/1985 | Pratt | 411/60 |
| 4,699,406 | 10/1987 | Swanson, Jr. | 292/DIG. 47 X |
| 5,065,490 | 11/1991 | Wivagg et al. | 411/60 X |

Primary Examiner—Richard E. Moore
Attorney, Agent, or Firm—S. Michael Bender

[57] ABSTRACT

A locking pin assembly for sliding members comprises a member having bifurcated portions insertable within a hole extending through the sliding members. The bifurcated portions are adapted to be cammed apart by a bar supported for slidable movement within the bifurcated portions thereby securely wedging the pin in the hole and locking the sliding members together. In one preferred embodiment, the bifurcated portions are supported in a sleeve and are joined to a handle portion extending through the other end of the sleeve. Actuation between a locked and unlocked position is effected by movement of the sleeve relative to the handle portion. In an alternative embodiment, the camming bar is omitted, and locking action is carried out instead by causing slidable movement of one wedging portion relative to another.

7 Claims, 6 Drawing Sheets

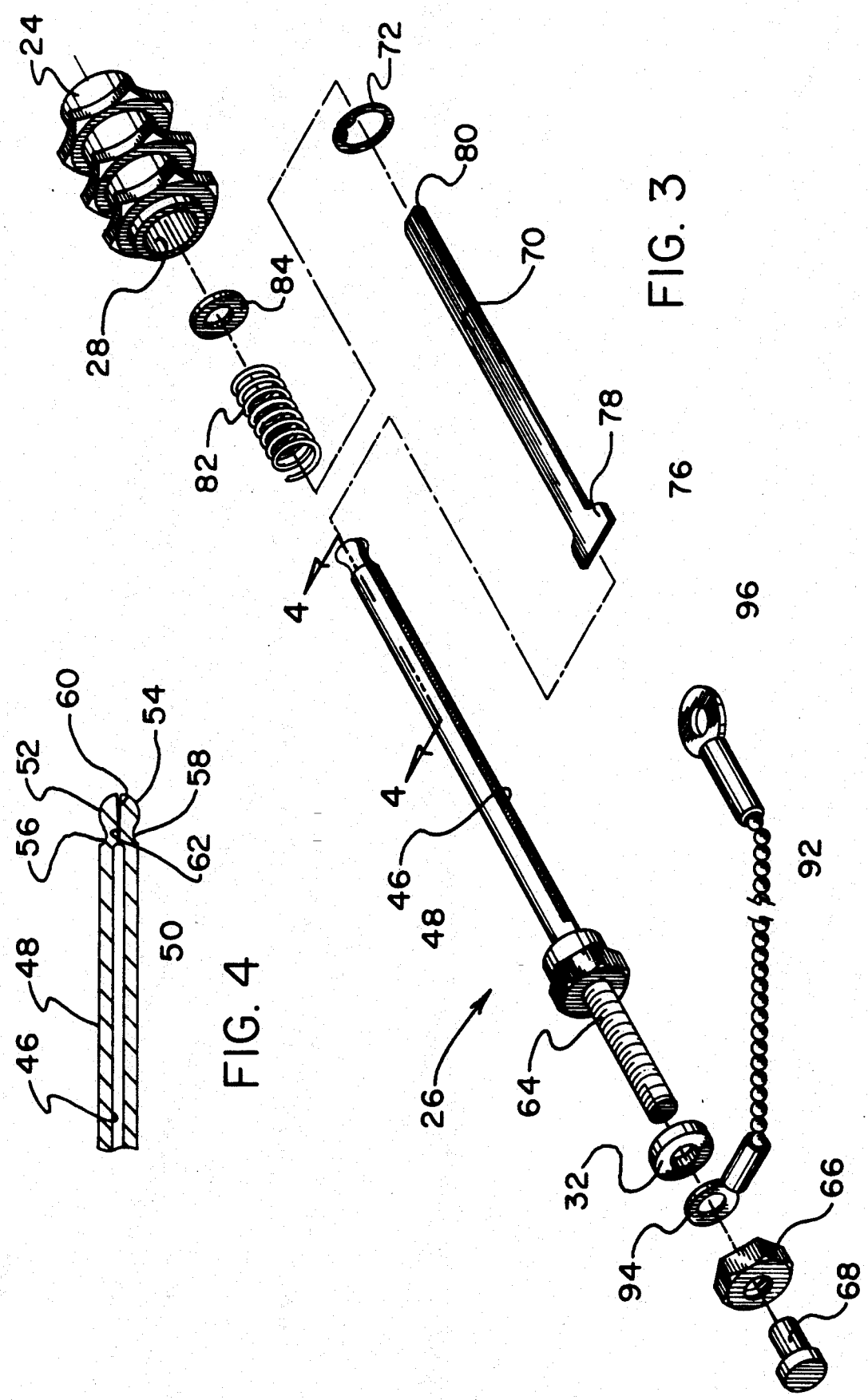

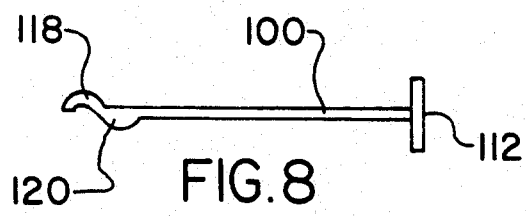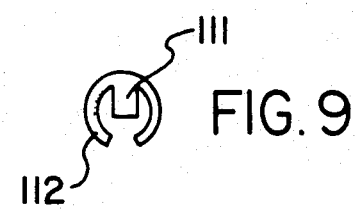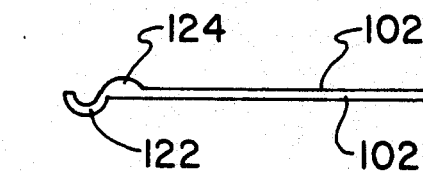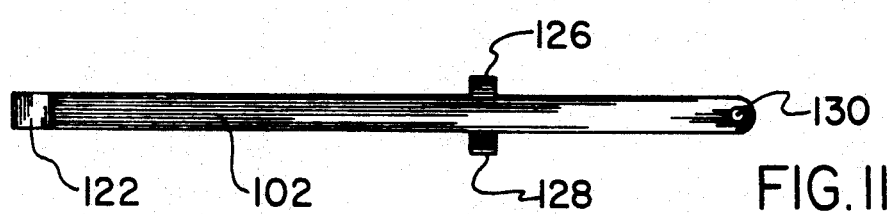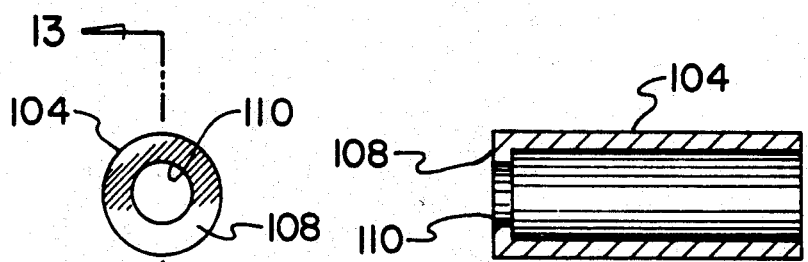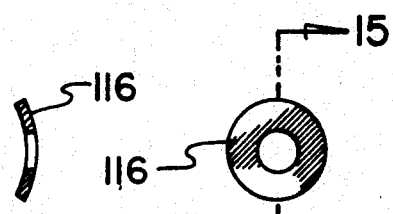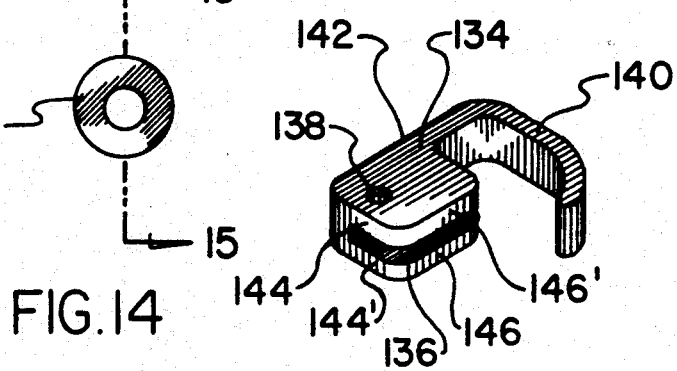

LOCKING PIN ASSEMBLY

BACKGROUND OF THE INVENTION

1. Field of the Invention

The present invention relates generally to locking pins, and more particularly to locking pin assemblies for preventing sliding movement of two members relative to each other such as window sashes, sliding glass doors, or the like.

2. Description of the Prior Art

It is known to insert a locking pin between a pair of window sashes, between a slidable window and its frame or between a pair of sliding glass door frames to prevent unauthorized opening of same. Examples of such locking pin applications are described in U.S. Pat. Nos. 4,713,911; 4,790,582; and U.S. Pat. No. Des. 302,382. Also known is a locking pin insertable into a channel formed by cooperating channels mounted on the edge of a swingable door and the door's jamb as exemplified by U.S. Pat. No. 4,844,519.

Each of the known prior art locking pins suffers from the disadvantage of being easily defeated by a hammering force applied to the locking pin or to the region of the sliding member(s) where the locking pin is located, i.e. they do not provide sufficient security against unauthorized entry. A need exists therefore for a locking pin which may be inserted in a hole extending between a pair of sliding members and which is capable of withstanding removal therefrom by hammer blows directed at the locking pin or the location where the locking pin is secured.

SUMMARY OF THE INVENTION

The foregoing requirement of providing an improved locking pin assembly and other advantages are achieved by the present invention which briefly described comprises a locking pin assembly which in the unlocked condition may be inserted within a pre-drilled hole extending orthogonally through a pair of frame members slidable with respect to each other. The locking pin assembly, in turn, has a pair of locking members which may be wedged or cammed apart once the assembly is seated to secure the assembly within the hole and prevent relative slidable movement of the frame members thus defining a locked condition. In a first preferred exemplary embodiment, the pair of locking members comprises a pin having at one end a pair of bifurcated portions and a camming bar supported for slidable movement within the slot defined by the bifurcation. The pin and camming bar are supported within a sleeve or barrel coaxially mounted thereabout. Integrally joined to the pin and extending oppositely from the bifurcated portions and through the sleeve's other end is a handle for facilitating slidable movement of the camming bar within the bifurcated portions. Thus, activation of the handle relative to the sleeve enable transition of the pin assembly between the locked and unlocked condition. In a second exemplary embodiment, each of the locking members has camming means thereon so that slidable movement therebetween directly causes the pin assembly to effect the locked condition thereby obviating the camming bar and reducing the cost of the pin assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least two preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved locking pin assembly which has all of the advantages of the prior art and none of the disadvantages.

It is another object of the present invention to provide a new an improved locking pin assembly which may be easily and efficiently manufactured and marketed.

It is a further objective of the present invention to provide a new and improved locking pin assembly which is of durable and reliable construction.

An even further object of the present invention is to provide a new and improved locking pin assembly which is susceptible of a low cost of manufacture with regard to both materials and labor, and which accordingly is then susceptible of low prices of sale to the consuming public, thereby making such locking pin assembly economically available to the buying public.

Still yet another object of the present invention is to provide a new and improved locking pin assembly which provides in the apparatuses and methods of the prior art some advantage thereof, while simultaneously overcoming some of the disadvantages normally associated therewith.

Still another object of the present invention is to provide a new and improved locking pin assembly which may be secured against unauthorized removal.

Yet still another object of the present invention is to provide a new and improved locking pin assembly actuatable between a locked and unlocked condition and which is impervious to removal in the locked condition.

It is yet still another object of the present invention to provide a new and improved locking pin assembly which in the locked conditions comprises a pair of wedged or cammed apart members sufficient to prevent unauthorized removal from the hole within which the assembly is seated.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 3 is a perspective view showing the first preferred embodiment of the invention in exploded assembly form.

FIG. 4 is an elevational cross-sectional view of a portion of the embodiment of FIG. 3 taken along line 4—4 thereof.

FIG. 8 is an elevational view of one of the wedging arms in the alternatively preferred embodiment of the invention.

FIG. 9 is an elevational view of one end of the wedging arm of FIG. 8.

FIG. 10 is an elevational view of the other wedging arm of the alternatively preferred embodiment.

FIG. 11 is a plan view of the wedging arm of FIG. 10.

FIG. 12 is an elevational view of one end of the sleeve of the alternatively preferred embodiment of the invention.

FIG. 13 is a cross-sectional view taken along line 13—13 of FIG. 12.

FIG. 14 is an elevational view of the retainer ring of the alternatively preferred embodiment.

FIG. 15 is a cross-sectional view taken along line 15—15 of FIG. 14.

FIG. 16 is a perspective view of the handle member of the alternatively preferred embodiment.

DESCRIPTION OF THE PREFERRED EMBODIMENT

With reference now to the drawings, a new and improved locking pin assembly embodying the principles and concepts of the present invention will be described. However, before proceeding it might be helpful to briefly review the prior art locking pin assemblies.

Figure 1:
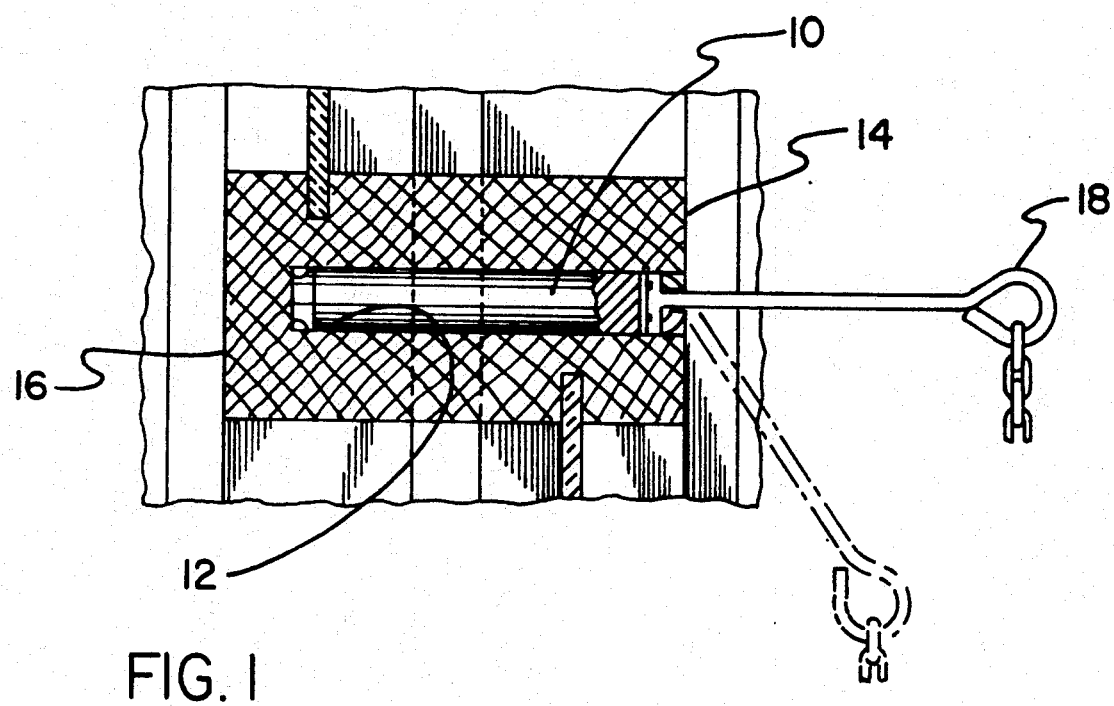
FIG. 1 is a view in elevation of a prior art locking pin assembly.

Turning to FIG. 1, there is shown a typical prior art locking pin assembly comprising a cylindrical rod or plug member 10 seated within a blind recess extending between a pair of sliding window frames 14, 16. A handle 18 connected to the pin is adapted to facilitate withdrawal of the pin from the recess to release the window frames for relative slidable movement. Although the pin is not visible from outside the window, strong hammer blows in the region of the pin assembly likely may cause unseating of the pin and unauthorized entry through the window.

Figure 2:
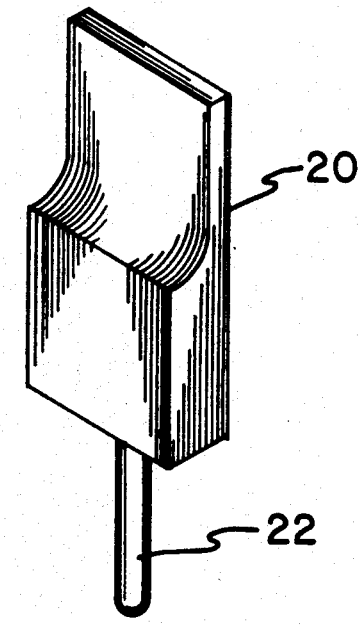
FIG. 2 is a perspective view in elevation of yet another prior art locking pin assembly.

In another form of prior art locking pin assembly, shown in FIG. 2, a wedge member 20 has a handle 22 depending therefrom. The wedge member may be inserted between two window frames to frictionally lock the frames together, or between a window frame and its sash, thereby preventing slidable movement of the window frames. Here again, however, it is apparent that the wedge may likely be removed by strong hammer blows directed at the region of the window frame where the wedging member is positioned.

Turning now to FIGS. 3-7, the first preferred embodiment of the present invention comprises a hollow cylindrical barrel or sleeve 24 within which is supported for slidable movement a core pin sub-assembly generally designated by reference manual 26. Hollow sleeve 24 defines a housing an interior cylindrical cavity 28 which is closed at one end by an end wall 30 and at its other opposite end by a cylindrical retainer 32. Both end wall 30 and cylindrical retainer 32 have, respectively, through holes 34, 36 centrally disposed therein (and coaxially aligned) to permit slidable movement of corresponding parts of the core pin sub-assembly 26 as will be more particularly described below. The sleeve 24 which functions as a grippable housing for the pin locking assembly preferably has a series of spaced, hexagonally shaped extensions 38 radially disposed thereon. These extensions may be of any other suitable shape. Suffice it to say, they facilitate gripping and manipulation of the housing by the fingers of the hand relative to the other parts of the assembly when the assembly is operated as will be further detailed below.

The core pin sub-assembly 26, in turn, comprises a central cylindrical bushing 40 having at one end an enlarged hexagonally shaped portion 42 substantially as shown which enlarged portion is sized to snugly, but freely, slide within the interior cavity 28 of the sleeve or housing 24. Integrally joined to the end of the bushing 40 opposite enlargement 42, and extending coaxially therefrom is a bifurcated locking rod or pin 44 having a slot 46 defining a pair of opposed spreadable tines 48, 50 capable of flexing or spreading apart at their distal extremities.

As best seen in FIG. 4, the tines 48, 50 terminate, respectively, at their distal ends in a pair of oppositely facing, rounded protrusions or knuckles 52, 54 defined by a corresponding pair of grooves 56, 58. In their normal condition the inner flat surfaces 60, 62 of knuckles 52, 54 contact each other thereby defining the distal extremity of slot 46. In accordance with the invention, knuckles 52, 54 serve as locking wedges adapted to securely engage the material of the window frame(s) or the like in which the locking pin assembly is inserted as will be made more apparent below.

Extending coaxially from the enlarged end 42 of the bushing 40, substantially as shown, is an externally threaded stud shank 64 adapted to cooperatively engage female threaded hex nut 66 which later serves as a locking collar when the locking pin assembly is installed as will be more fully described. Suffice it to say at this juncture, rotation of the hex nut 66 on threaded stud shank 64 causes the hex nut to advance coaxially along the extent of the shank 64 either to the right or to the left as viewed, say, in FIGS. 5 and 6, depending upon whether nut 66 is rotated clockwise or counter-clockwise, respectively.

An end cap 68, preferably of polymeric material, suitably is affixed to the distal end of stud shank 64 as shown to provide a handle member for actuating the core pin sub-assembly relative to the sleeve 24 as will be further explained below.

A substantially flat bar or camming member 70 is sized to be received within slot 46 of bifurcated rod 44 and is adapted to slide relative to and between tines 48, 50 when the core pin sub-assembly is slidably displaced relative to housing 24. In accordance with the invention and during such slidable displacement, the bar member 70 and the housing remain fixed relative to each other. To maintain the fixed relationship, a resilient C-ring spring retainer 72 is seated within a circumferential slot or groove 74 recessed into the wall surface of the sleeve's interior cavity 28 (see FIGS. 5 and 6). The C-ring is adapted to bear against end edge 76 defined by the laterally enlarged end portion 78 of the flat bar 70 (FIG. 3) as the flat bar reposes within slot 46. In addition, the diameter of the central opening of the C-ring retainer 72 is large enough to permit the tines 48, 50 of the bifurcated rod 44 to slide freely therethrough. Thus, even though the core pin sub-assembly 26 may slide relative to sleeve 24 within the latter's interior cavity 28, the flat bar 70 will remain stationary with respect to the sleeve via the retaining action of the C-ring against edge 76. Hence, the flat bar 70 is adapted to slide relative to the core pin sub-assembly 26 within slot 46 when the core pin sub-assembly is slidably displaced relative to the sleeve 24. Flat bar 70 preferably is further provided within a beveled distal edge 80. Accordingly, when the core pin sub-assembly is caused to slidably displace to the left relative to both sleeve 24 and the constrained flat bar 70, as viewed in FIG. 6, for example, the beveled edge 80 functions as a knife-blade to cam part or flex tines 48, 50 away from each other. This camming or spreading action of the tines by the action of the sliding flat bar 70 creates a wedging effect and defines the locking condition of the locking pin assembly according to the present invention.

In accordance with another feature of the invention, the locking pin assembly normally is maintained in the aforesaid locking condition by the presence of spiral compression spring 82 coaxially disposed within cavity 28 of sleeve 24 in circumscribing relation to bifurcated rod 44. One end of spring 82 bears against bushing 40 whereas the other end of spring 82 bears against a retainer in the form of a cylindrical washer 84 also coaxially disposed about bifurcated rod 44 adjacent end wall 30 of sleeve 24 substantially as shown. By the action of compression spring 82 which extends axially through the central opening defined by resilient C-ring 72, a force normally is applied to the left (FIGS. 5 and 6) against enlarged porion 42 thereby urging the core pin sub-assembly 26 to the left until the enlarged portion bears against sleeve end retainer 32. In this position, it will be noted, the flat bar 70 causes the tines to flex apart creating the wedging or locking condition of the locking pin assembly of the present invention.

Figure 5:
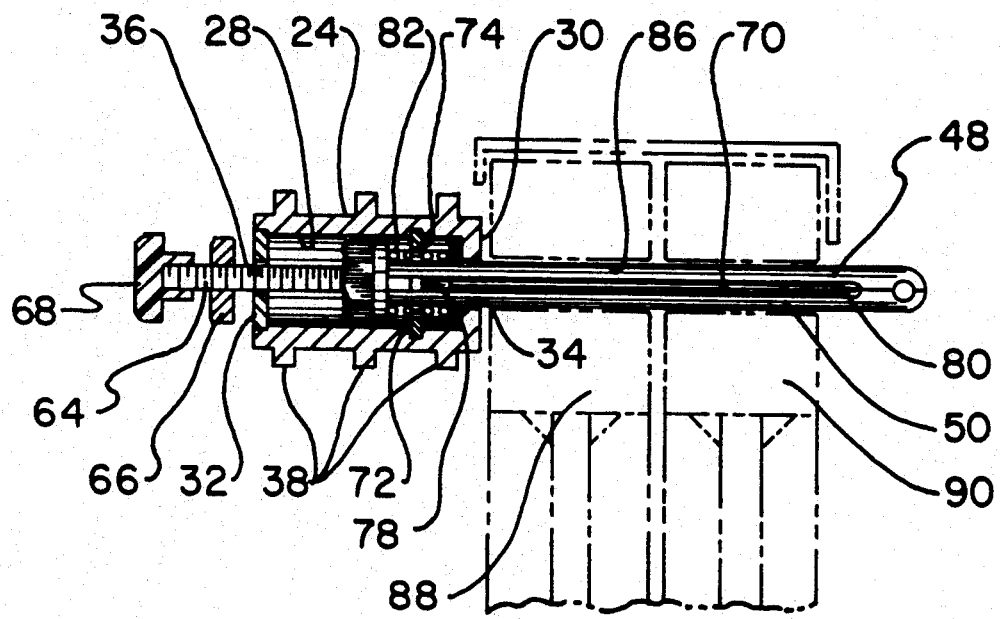
FIG. 5 is a elevational cross-sectional view of the first preferred embodiment of the invention showing the locking pin assembly in the unlocked condition.
Figure 6:
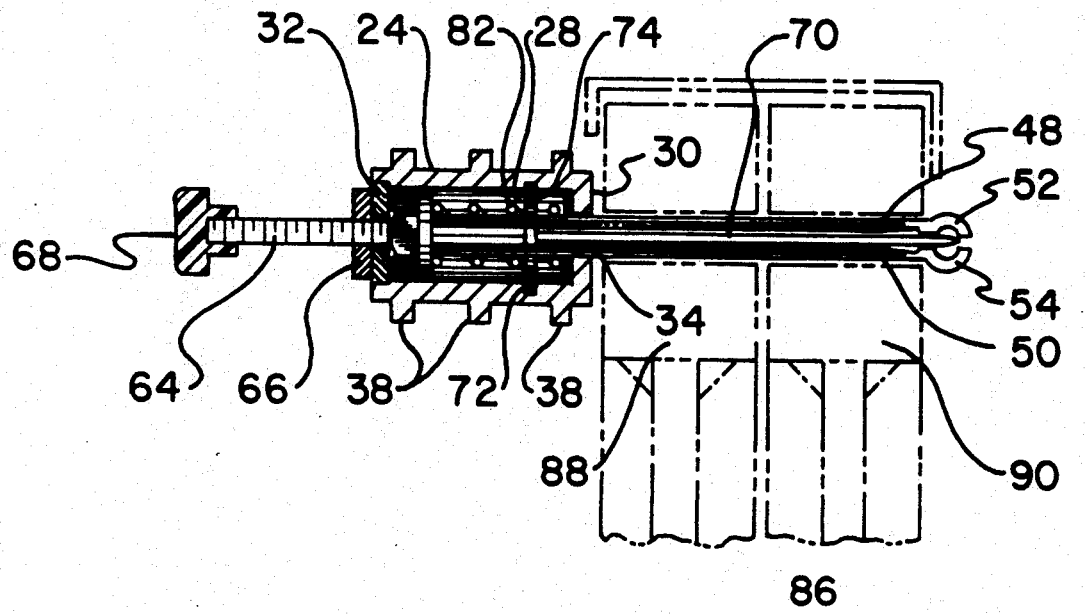
FIG. 6 is an elevational cross-sectional view of the embodiment of FIG. 5 showing the locking pin assembly in the locked condition.
Figure 7:
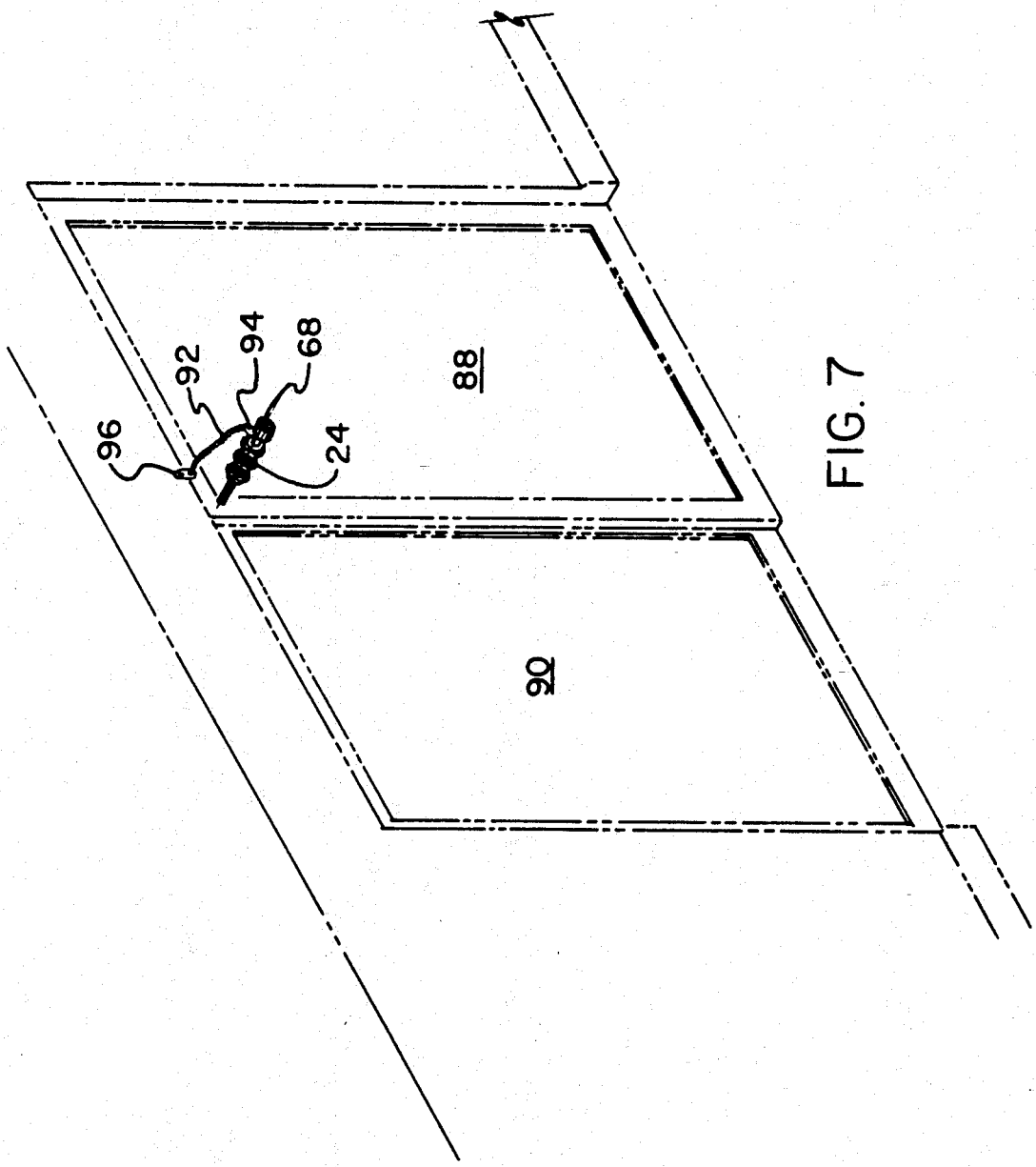
FIG. 7 is a perspective diagrammatic view showing the locking pin assembly of FIGS. 5 and 6 in use with a pair of sliding glass door frames.

In use, the locking collar 66 is rotated counter-clockwise to cause it to backoff stud shank 64 sufficiently to permit slidable displacement of the core pin assembly 26 to the right (as viewed in FIG. 5) thereby causing slidable relative displacement of flat bar 70 relative to tines 48, 50 within slot 46. Such slidable displacement may easily be effected by holding the sleeve 28 in one hand, holding the handle member 68 with the other hand, and either pushing the handle toward the sleeve, or pulling the sleeve toward the handle, whichever is more comfortable, against the force of compression spring 82. This places the locking pin assembly in the unlocked condition as illustrated in FIG. 5 whereupon it may be inserted easily into a suitably size pre-drilled hole 86 extending orthogonally through a pair of sliding members 88, 90 (e.g. the frames of sliding glass doors shown in broken lines in FIGS. 5 and 6). With the sleeve being held against the frame, the handle 68 may be released to cause compression spring 82 to slide the core pin assembly to the left thus creating the locked condition of the pin assembly (FIG. 6). Locking collar 66 may then be rotated clockwise to lock the sleeve securely in place. It will be appreciated that in the position shown in FIG. 6, knuckles 52, 54 are wedged apart making it extremely difficult, if not impossible, to dislodge the locking pin assembly via hammer blows directed against the expanded knuckles. In fact, such hammer blows will serve to render the wedging action even stronger by possibly distorting the knuckles and creating an increased wedging action.

To release the locking pin assembly, all that is necessary is to back off the locking collar 66 by suitable rotation thereof and move the handle relative to the sleeve against the force of the compression spring 82 thereby retracting flat bar 70 from between surfaces 60, 62 (i.e. withdrawal back into slot 46) and causing the bifurcated tines to retract and accordingly, the wedge formed by knuckles 52, 54 to diminish sufficiently to allow withdrawal of the pin assembly from hole 86. As an optional feature, a flexible ball chain 92 having eyelets 94, 96 fastened to each end may be employed as a convenient device to facilitate mounting of the locking pin assembly near the pre-drilled hole in the slidable frame members to be secured. In such a case, one of the eyelets 94 is coaxially mounted on stud shank 64 whereas the other eyelet 96 may be screwed or otherwise suitably fastened to the wall in the vicinity of the sliding-members to be secured by the locking pin assembly. One such typical arrangement is illustrated by way of example in FIG. 7 in connection with the pair of sliding glass doors 88, 90 only partially shown in FIGS. 5 and 6.

Turning now to FIGS. 8-19, there is shown an alternatively preferred form of locking pin assembly in accordance with the invention which comprises fewer parts, is less expensive to fabricate, yet is as equally effective as the embodiment of FIGS. 2-7.

A pair of unequal length substantially flat arms 100, 102 are supported for relative slidable movement with respect to each other in a hollow cylindrically shaped housing 104 having an open end 106, and an end wall 108 terminating its opposite other end. The end wall 108 has a central through hole 110 therein defining a passage for wedging arms 100, 102, each of which has one end supported within the interior 112 of the housing and has its opposite other end extending axially and distally from the housing end through hole 110.

As best seen in FIGS. 8 and 9, arm 100, the shorter of the two arms, terminates in a retainer in the form of a up-struck tab 111 and an integral C-shaped ring 112 whose diameter is sized so that when the arm is seated in housing 104 the C-ring bears against the inside surface 114 of end wall 108 thereby retaining the arm within the housing and preventing it from being displaced towards its distally extending other end. Arm 100 is fixed substantially in the position shown and restrained from movement with respect to housing 104 by means of a resilient spring washer 116 having substantially the same diameter as C-ring 112 and seated at the end of the interior of housing 104 in a suitable manner to bear against the C-clip and maintain arm 100 stationary with respect to the housing substantially in the position shown in FIGS. 17 and 19.

Figure 18:
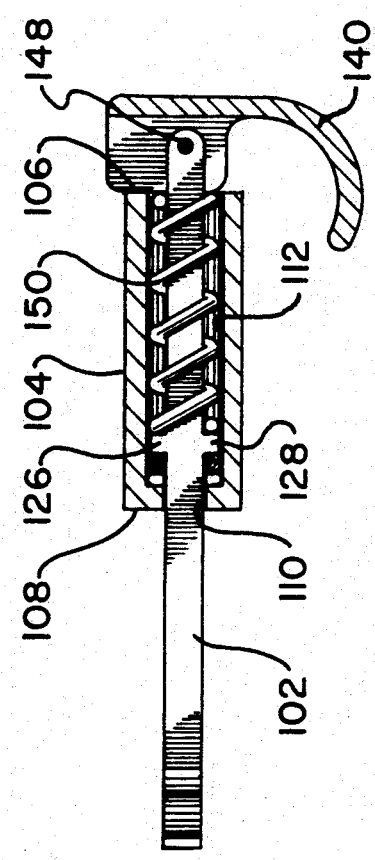
FIG. 18 is an elevational cross-sectional view of the embodiment of FIG. 17 in the locked condition.
Figure 19:
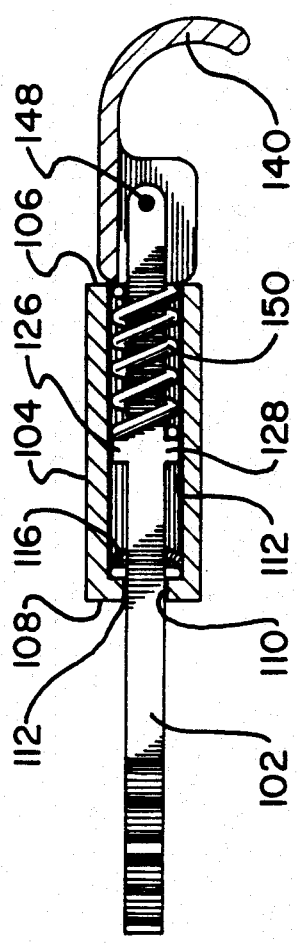
FIG. 19 is an elevational cross-sectional view of the embodiment of FIG. 17 in the unlocked condition.
Figure 17:
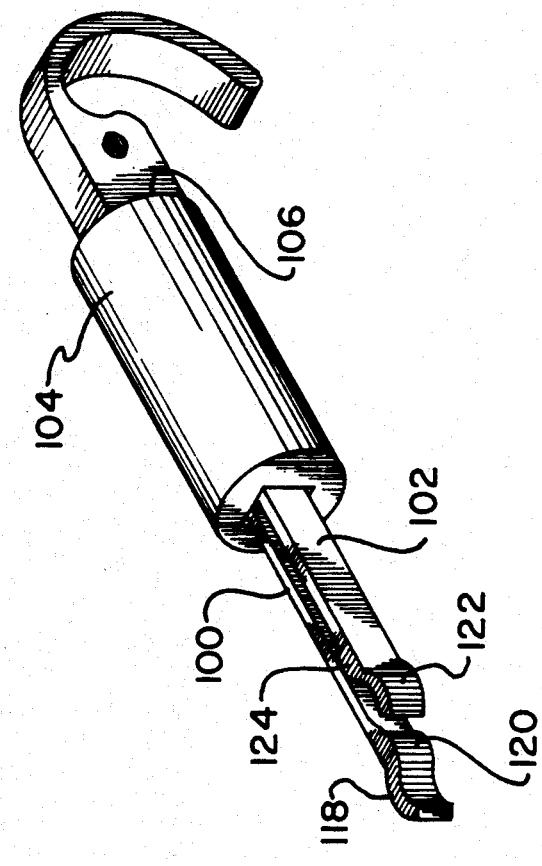
FIG. 17 is a perspective view of the assembled alternatively preferred embodiment.

The distal end of arm 100 terminates in an S-shaped curve so as to provide a pair of protruding cams 118, 120 substantially as shown in FIGS. 8 and 17. Arm 102, the longer of the two arms, also has its distal end terminate in a similar S-shaped curve to define a pair of mirror-imaged protruding cams 122, 124 adapted to confront the cams 118, 120 of arm 100 as will be further explained. Arm 102 has an integral pair of laterally extending tabs 126, 128 (FIGS. 10 and 11), and a through hole 130 extending through its other end as shown. The transverse extent of both tabs is slightly less than the diameter of the interior of housing 104. In accordance with the invention, the longer arm is mounted for slidable support relative to housing 104 with the tabs 126, 128 positioned within the interior of the housing, and with the end carrying hole 130 extending out of the housing's open end. This arrangement is best seen in FIGS. 18 and 19 wherein it will be observed the distal end of arm 102 extends through the central hole in spring retainer 116, the semi-cylindrical opening 132 in C-ring 112, and the central hole 110 in the housing's closed end. Thus, arms 100, 102 are supported by the housing in a parallel juxtaposed manner and are adapted to slide relative to each other with the ability of the longer arm 102 to slide toward the distal end of the shorter arm 100 being limited by the engagement of tabs 126, 128 against spring washer 116 (FIG. 18). In this relative position of the parts, the cam surfaces 120, 124 will directly confront each other and cause the distal ends of both arms to flex apart from each other thereby creating a wedge. This is the locked condition of the alternatively preferred locking pin assembly.

A handle is provided (FIG. 16) comprising a U-shaped channel portion 134 defining a slot 136, and further having a through hole 138 transversely extending through the channel side portion substantially as shown. The handle preferably further has an arcuate shaped finger grip 140 integrally extending from the top edge 142 of the channel portion. The latter which is substantially rectangular in shape defines two distinct cam surfaces, the first comprising front edges 144, 144'; and the second comprising bottom edges 146, 146', the purpose of which will become more apparent below.

A suitable pin fastener 148 extending transversely through hole 138 in the channel portion and thence through hole 130 in the end of longer arm 102 operatively joins the handle member to the arm and therefor to the housing, and permits the handle to pivot about an axis common to the pin fastener and perpendicular to the plane of the paper as viewed in FIGS. 18 and 19 substantially as shown therein. Interiorly of the housing is a spiral compression spring 150 having one end engaging tabs 126, 128 and the other or opposite end engaging either the first or the second cam surfaces defined by the handle depending upon the position of the handle. In the locked or normal position of the handle, shown in FIG. 18, the second cam surface (edges 146, 146') engages the end of the housing and the spring, and the compression of the spring urges the longer arm 102 forward relative to the distal end of the shorter arm 100 whereupon the distal cam surfaces 124, 120 on both arms slide up and upon each other to create the aforementioned locked or wedged condition.

In order to release the pin assembly and transition to an unlocked condition, all that is necessary is to rotate the handle counterclockwise with one hand while holding the housing with the other hand. This action is effective to cause the first cam surface on the handle (edges 144, 144') to engage the open end of the housing and in so doing slide arm 102 back into the housing relative to fixed arm 100. This in turn, causes the cam surfaces 120, 124 on the distal ends of both arms to disengage thereby diminishing the wedging action of the confronting arms. In this position, shown in FIG. 19, the pin assembly is in the unlocked condition and may be either inserted into or withdrawn from a predrilled hole extending between a pair of sliding members as in the prior exemplary embodiment. It will be appreciated that in the locked position of the alternative assembly (FIG. 18), the handle pivot point is located a shorter distance from the open end of the housing than is the case when the pin assembly is in the unlocked condition, where by virtue of the design of the first and second cam surfaces, the pivot point is a greater distance from the open end of the housing. This difference between pivot point displacements defines the longitudinal or axial extent of slidable displacement between arm 100 (fixed with respect to the housing) and arm 102 (slidable with respect to both the housing and the shorter arm 100).

It should be apparent from the above description of the alternatively preferred embodiment that this form of the invention although simpler in design and consisting of fewer parts is capable of performing the same wedge locking action and is relatively impervious to dislodgement by hammer blows directed at the installed pin assembly or at the region of the installation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to illustrated in the drawings and described in the specification are intended to be encompassed by the present invention. For example, although the preferred embodiments have been illustrated and described above with the tips of the spreadable times and protruding knuckles extending entirely through both sliding members adapted to be secured, it will be appreciated that an axially shorter version may be employed where the distal extremity of the locking pin assembly extends only partially through the second member and terminates within the hollow core or interior of the second sliding glass door, for example, as this arrangement will not be visible from outside and therefore will provide an extra degree of security.

Accordingly, while the present invention has been shown in the drawings and fully described above with particularity and detail in connection with what is presently deemed to be the most practical and preferred embodiment(s) of the invention, it will be apparent to those of ordinary skill in the art that many modifications there of may be made without departing from the principles and concepts set forth. Hence, the proper scope of the present invention should be determined only by the broadest interpretation of the appended claims so as encompass all such modifications and equivalents.

What is claimed as being new and desired to be protected by LETTERS PATENT of the United States is as follows:

1. A new and improved apparatus for preventing relative slidable movement between first and second members, comprising:
   a housing,
   actuatable locking means extending from said housing and adapted to be inserted in a hole common to said first and second members,
   means associated with said housing for actuating said locking means after said locking means has been inserted in said common hole,
   wherein said actuatable locking means comprises a pair of longitudinally extending arms, one end of said arms being supported in said housing, the other end of said arms being adapted for axial insertion in said common hole, said means for actuating including means for changing the relative orientation of said arms with respect to each other so as to lockingly engage said first and second members upon actuation thereof,
   wherein said arms extend from said housing in a parallel juxtaposed manner with respect to each other and said means for changing the relative orientation of said arms includes camming means effective to wedge said arms apart,
   wherein at least one of said arms includes a protrusion on its distal end adapted to engage at least one of said first or second members in the actuated condition thereof,
   wherein said arms comprise the tines of a bifurcated rod, said rod having one end thereof supported in said housing so that said tines extend axially from said housing,
   said means for changing the relative orientation of said arms comprising handle means coupled to said bifurcated rod at the end thereof opposite said tines, said handle means adapted to cause said rod to slidably displace axially relative to said housing, and camming means fixed to said housing and cooperatively engaging said tines whereupon relative movement of said handle means with respect to said housing enables said camming means to engage said tines in such a manner as to cause said tines to spread apart with respect to each other,
   wherein said camming means comprises a flat bar disposed between said tines, one end of said bar being retained in said housing and the other end of said bar terminating along the axial extent of said tines,
   wherein each tine in said pair has a distal extremity shaped to contact the distal extremity of the other and said flat bar has a distal edge adapted to slide between the distal extremities of said tines to separate said tines from mutual engagement upon slidable displacement of said tines relative to said flat bar therebetween as a result of movement of said handle means relative to said housing,
   wherein said housing further includes resilient biasing means for urging said handle means to displace axially relative to said housing sufficient to cause said flat bar to be normally reposed between the opposed distal extremities of said tines.

2. The invention of claim 1 wherein said handle means is connected to said bifurcated rod within said housing and said resilient biasing means comprises a spiral compression spring disposed axially in said housing between one end of said housing and joinder of said handle and said bifurcated rod.

3. The invention of claim 2 wherein said handle means further comprises locking means for fixing the relative position of said handle and said housing in said normally reposed condition.

4. A new and improved apparatus for preventing relative slidable movement between first and second members, comprising:
   a housing,
   actuatable locking means extending from said housing and adapted to be inserted in a hole common to said first and second members,
   means associated with said housing for actuating said locking means after said locking means has been inserted in said common hole,
   wherein said actuatable locking means comprises a pair of longitudinally extending arms, one end of said arms being supported in said housing, the other end of said arms being adapted for axial insertion in said common hole, said means for actuating including means for changing the relative orientation of said arms with respect to each other so as to lockingly engage said first and second members upon actuation thereof,
   wherein said arms extend from said housing in a parallel juxtaposed manner with respect to each other and said means for changing the relative orientation of said arms includes camming means effective to wedge said arms apart,
   wherein one of said arms is fixed to said housing and extends axially from one end of said housing, and the other of said arms is adapted to axially displace relative to said housing and wherein said means for changing the relative orientation of said arms comprises handle means for causing relative sliding axial movement of said other arm with respect to said housing and said camming means comprises a pair of confronting protrusions extending from said arms toward each other whereby relative slidable movement of said other arm with respect to said one arm causes said protrusions to mutually engage thereby causing said arms to spread apart with respect to each other,
   wherein said other arm has an other end extending through said housing, said other arm's other end being pivotally connected to a handle member, said pivotal connection enabling said handle to rotate thereabout between a first position and a second position, said pivotal connection being spaced further from said housing in said second position than it is spaced therefrom in said first position whereupon rotation of said handle member to said first position from said second position causes sufficient axial displacement of said other arm relative to said housing and said one arm fixed thereto to cause said pair of protrusions to mutually engage and thereby cause spreading apart of said arms.

5. The invention of claim 4 wherein said housing further comprises resilient biasing means for normally positioning said handle member in said first position.

6. The invention of claim 5 wherein said other arm has a pair of tabs laterally extending intermediately thereof and wherein said resilient biasing means comprises a spiral compression spring located axially in said housing circumscribing a portion of said other arm and engaging said handle member at one extremity thereof and engaging said tabs at another extremity thereof.

7. The invention of claim 6 wherein said handle member further comprise finger grip means for facilitating rotation thereof relative to said housing between said first and second positions.

* * * * *